US005799930A

United States Patent [19]

Willett

[11] Patent Number: 5,799,930

[45] Date of Patent: Sep. 1, 1998

[54] BODY MOUNT ASSEMBLY

[75] Inventor: Mark A. Willett, Midland, Mich.

[73] Assignee: Means Industries, Inc., Saginaw, Mich.

[21] Appl. No.: 792,173

[22] Filed: Jan. 30, 1997

[51] Int. Cl.[6] .............................. F16F 9/00; B62D 23/00; B62D 24/02

[52] U.S. Cl. .............................. 267/141.4; 267/141.5; 296/35.1

[58] Field of Search .............................. 248/632–638; 403/224, 227, 228; 296/35.1; 267/141.4, 141.5, 293, 294

[56] References Cited

U.S. PATENT DOCUMENTS

Re. 35,123 12/1995 Wagner .............................. 296/35.1
2,144,170 1/1939 Utz et al. .............................. 296/35.1
2,879,090 3/1959 Everitt et al. .............................. 403/228
2,951,674 9/1960 Rice .............................. 267/141.4
3,218,101 11/1965 Adams .............................. 296/35.1
3,266,139 8/1966 Adams .............................. 267/141.4
3,622,194 11/1971 Bryk .............................. 296/35.1
3,809,427 5/1974 Bennet .............................. 296/35.1
4,286,777 9/1981 Brown .............................. 248/635
4,358,098 11/1982 Ceseri .............................. 267/141.5
4,923,237 5/1990 Kiefer et al. .
4,976,412 12/1990 Simon et al. .
4,978,163 12/1990 Savio .
4,995,469 2/1991 Mikkelsen et al. .
4,998,592 3/1991 Londt et al. .
5,004,293 4/1991 Thomas .
5,024,283 6/1991 Deli .
5,170,985 12/1992 Killworth et al. .............................. 248/635
5,176,417 1/1993 Bauer .
5,178,433 1/1993 Wagner .
5,181,688 1/1993 Hutchison et al. .
5,219,439 6/1993 Moore et al. .
5,238,267 8/1993 Hutchison et al. .
5,246,212 9/1993 Funahashi et al. .
5,248,237 9/1993 Nakamura .
5,249,834 10/1993 Johnson et al. .
5,251,911 10/1993 Blake .
5,273,340 12/1993 Nelson et al. .
5,303,973 4/1994 Fujii .
5,310,239 5/1994 Koske et al. .
5,314,230 5/1994 Hutchinson et al. .
5,342,106 8/1994 Fischer .
5,388,884 2/1995 Keehner et al. .
5,391,042 2/1995 Song .
5,405,118 4/1995 Dietz et al. .............................. 248/635
5,409,283 4/1995 Ban .
5,437,499 8/1995 Musso .
5,443,280 8/1995 Kawaguchi et al. .
5,454,443 10/1995 Fischle et al. .
5,484,034 1/1996 Benz et al. .
5,498,060 3/1996 Satomi .

FOREIGN PATENT DOCUMENTS 3279082 12/1991 Japan .............................. 296/35.1

*Primary Examiner*—Robert J. Oberleitner
*Assistant Examiner*—Chris Schwartz
*Attorney, Agent, or Firm*—Brooks & Kushman

[57] ABSTRACT

A shock absorbing assembly capable of being connected to a vehicle frame member having a frame member aperture defining an aperture perimeter and for dampening movements between a body member and the vehicle frame member. The shock absorbing assembly comprising a first spacer member and a second spacer member. The first spacer member has first absorption material and a first locking member having one of a male and female configuration and the second spacer has second absorption material and a second locking member having the other of a male and female configuration. The male configuration includes at least one prong having at least one locking protrusion and the female configuration includes at least one female recess. The female recess defines at least one locking recess such that the first spacer member may be connected to the second spacer member through the frame member aperture by inserting the at least one prong into the at least one female recess such that the at least one prong is displaced laterally before the at least one locking protrusion interlocks with the at least one locking recess.

33 Claims, 2 Drawing Sheets

BODY MOUNT ASSEMBLY

TECHNICAL FIELD

This invention relates to an improved body mount for coupling a body or other component to the frame of a vehicle.

BACKGROUND ART

Body mount assemblies are commonly used in the automotive industry to secure a body panel to a frame during assembly of a vehicle. Most vehicle body mount assemblies include blocks or cylinders of elastomeric materials located between the body panel and the frame which insulate the body panel from vibrations and shocks.

An example of such a prior art body mount assembly device is disclosed in U.S. Pat. Nos. 5,178,433 and Re. 35,123, both of which issued to Wagner. The Wagner patents disclose a vehicle body mount assembly wherein a pair of elastomeric blocks are spaced to receive a vehicle frame member therebetween. A tubular portion of an upper spacer member extends through apertures in the elastomeric blocks and vehicle frame to engage a tubular portion of a lower spacer member. Radially extending flanges on the upper and lower spacer members engage the elastomeric blocks to clamp the blocks to the frame. A separate third component, a clip member, is inserted onto the tubular portion of the upper spacer member prior to assembly with the tubular portion of the lower spacer member and serves to keep the upper and lower spacer members in engagement until the vehicle body is attached to the body mount by a bolt.

A disadvantage of the body mount assembly disclosed in the Wagner patents is that it requires the assembly of three separate components, the upper spacer member, the lower spacer member, and the clip member, in order to retain the two elastomeric blocks in proper position. Another disadvantage is that because the tubular portion of the upper spacer member has a diameter less than the vehicle frame aperture, the assembly may have to be adjusted laterally along the vehicle frame in order to align it properly with the vehicle body so that the vehicle body may be attached to the body mount with the bolt.

Another type of body mount assembly arrangement is disclosed in U.S. Pat. No. 5,170,985, which issued to Killworth et al. The Killworth patent discloses a mounting fixture for mounting a vehicle body to a support member or vehicle frame which includes an integrally formed cushioning member. More specifically, cushioning members are attached to both the upper and lower spacer members and are sandwiched between flanges of the upper and lower spacer members and the vehicle frame. A metal reinforcing member is molded into the cushioning member of the upper spacer member to provide additional reinforcement between the vehicle frame and the upper retainer assembly. The upper and lower spacer members are held in telescopic relationship by a separate third component, an insert member, until the body can be secured to the frame by a bolt or the like.

Like the body mount disclosed in the Wagner patents, the body mount assembly disclosed in the Killworth patent has the disadvantage of requiring at least three components, the upper spacer member, the lower spacer member, and the insert member.

These and other problems and disadvantages of the prior art are overcome by the present invention as summarized below.

SUMMARY OF THE INVENTION

This invention is directed to an improved shock absorbing or vehicle body mount assembly which may be used by assembling two components onto a vehicle frame, a first spacer member and a second spacer member.

In one embodiment, the invention is a shock absorbing assembly for connection to a vehicle frame member having a frame member aperture defining an aperture perimeter and for dampening to some extent movements between a body member and the vehicle frame member. The shock absorbing assembly comprises a first spacer member having first absorption material and a first locking member. This embodiment further includes a second spacer member having second absorption material and a second locking member such that the first spacer member may be connected to the second spacer member through the frame member aperture by interlocking the first and second locking members.

The first spacer member may also include a first shell such that the absorption material is laterally supported by the first shell and the first locking member and the second spacer member may likewise include a second shell such that the absorption material is laterally supported by the second shell and the second locking member.

In an alternative embodiment, the invention is a body mount assembly for connecting a body member having a body aperture to a vehicle frame member having a frame aperture defining an aperture perimeter. The body mount comprises a first spacer member having first absorption material and a first locking member and defining a first bore together with a second spacer member having second absorption material and a second locking member and defining a second bore such that the first spacer member may be connected to the second spacer member through the frame member aperture by interlocking the first and second locking members such that the first and second bores are aligned. In all of these embodiments, the first locking member may have one of a male and female configuration while the second locking member may have the other one of a male and female configuration. The male configuration may include at least one prong having at least one locking protrusion and the female configuration may include at least one recess which defines at least one locking recess such that the first spacer member may be connected to the second spacer member through the frame member aperture via the interlocking of the at least one prong having at least one locking protrusion with the at least one locking recess of the at least one recess.

Furthermore, in each of these embodiments, the first and second locking members are adjacent the aperture perimeter so as to transmit any contact forces with the aperture perimeter to at least one of the first and second absorption material.

Furthermore, the body mount assembly embodiment may include a fastening device which, after the body member aperture is aligned with the first and second bores, is used to attach the body member to the first and second spacer members via the body member aperture and the first and second bores. In a more specific embodiment, one of the first and second spacer members includes a connector having a threaded aperture and the fastening device is a threaded bolt member which is situated through the body aperture and the first and second bores and threadably engages the threaded aperture so as to attach the body member to the first and second spacer members.

In another more specific embodiment, the invention is a vehicle body mount assembly for connecting a body member having a body aperture to a vehicle frame member having a frame aperture defining an aperture perimeter. The body mount assembly of this embodiment comprises a first spacer member having a first shell, first absorption material, and a first locking member. The first shell has a first tubular portion, a first flange and a first inner wall and the first absorption material is located adjacent and connected to the first inner wall. The first locking member has one of a male and female configuration and is connected adjacent to the first absorption material so that the first absorption material is laterally supported by the first shell and the first locking member. This embodiment further includes a second spacer member having a second shell, second absorption material, and a second locking member. The second shell has a second tubular portion, a second flange, and a second inner wall. The second absorption material is located adjacent and connected to the second inner wall. The second locking member has the other one of a male and female configuration and is connected adjacent the second absorption material so that the second absorption material is laterally supported by the second shell and the second locking member. Accordingly, the first spacer member may be connected to the second spacer member through the frame member aperture by interlocking the first and second locking members such that the first and second tubular portions are aligned.

In a more specific embodiment, the first flange may have a first radially extending portion and a first axially extending portion such that the first absorption material is laterally supported between the first tubular portion, the first axially extending portion, and the first locking member. Likewise, the second flange may have a second radially extending portion and a second axially extending portion such that the second absorption material is laterally supported between the second tubular portion, the second axially extending portion, and the second locking member.

In yet another more specific embodiment, the male configuration includes at least one prong having at least one locking protrusion and the female configuration includes at least one recess having at least one locking recess such that the first spacer member may be connected to the second spacer member through the frame member aperture via the interlocking of the at least one prong having at least one locking protrusion with the at least one recess having at least one locking recess such that the first and second tubular portions are aligned. Even more specifically, the first and second spacer members may have first and second axes respectively and the at least one recess is a cylindrical space and the at least one locking recess is continuous along a perimeter of the at least one recess such that the one of the first and second locking member having the male configuration may be rotated about one of the first and second axes before the at least one prong having at least one locking protrusion is inserted into the at least one recess.

In another more specific embodiment, the first and second absorption material surrounds the first and second tubular portions respectively. Even more specifically, the first and second locking members may surround that portion of the first and second absorption material respectively which is not laterally supported by the first and second radially extending portion of the first and second flanges respectively.

Lastly, the body mount assembly may include a fastening device which is located through the body aperture of the first and second tubular portions so as to attach the body member to the first and second spacer members.

An advantage to the present invention is that the need for a third piece, such as a clip assembly, is not required in order to assemble the first and second spacer members.

Another advantage of the present invention is that the first and second spacer members may be rotated relative to each other along their common axes before assembly at the aperture of a frame member.

Another advantage of the present invention is that the first and second spacer members provide lateral support and stability to the energy absorbing materials used, thereby allowing the use of materials which could not be used without such lateral support.

The above objects, features and advantages of the present invention, and others which are not presently set forth are or will be readily apparent from the following detailed description of the best mode for carrying out the invention when taken in with the accompanying drawings.

BRIEF DESCRIPTION OF THE DRAWINGS

While various embodiments of the invention are illustrated, the particular embodiments shown should not be construed to limit the claims. It is anticipated that various changes and modifications may be made without departing from the scope of this invention.

BEST MODE FOR CARRYING OUT THE INVENTION

Figure 1:
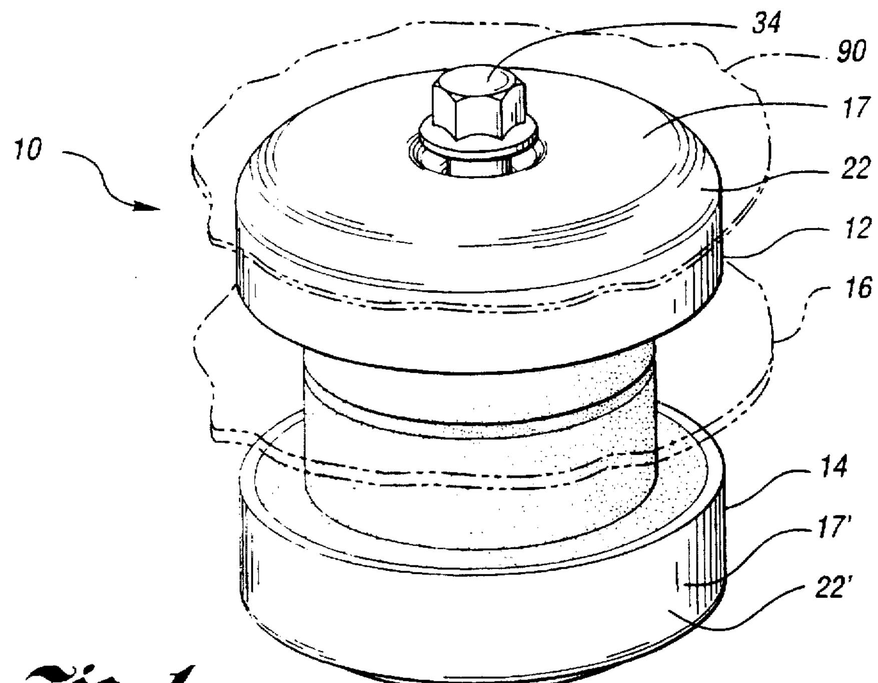
FIG. 1 is a perspective view of the components of a vehicle body mount assembly of the present invention in an assembled state.

Referring now to FIG. 1, the vehicle body mount assembly 10 of the present invention is illustrated. The body mount assembly 10 includes a first spacer member 12 and a second spacer member 14. While the first spacer member 12 and second spacer member 14 may have any suitable shape, in the embodiment shown they are generally cylindrical and are adapted to be mounted onto a vehicle frame, shown in phantom in FIG. 1 and generally indicated at 16.

Figure 2:
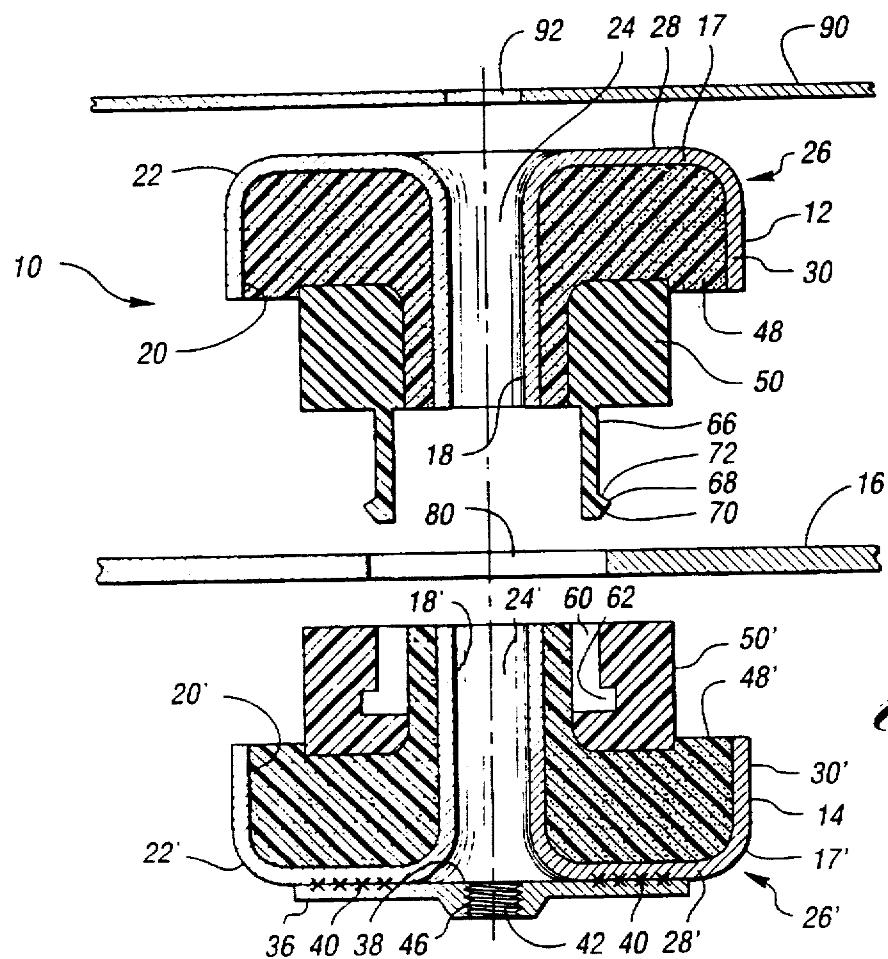
FIG. 2 is an exploded cross-sectional view of a vehicle body amount assembly of the present invention.
Figure 3:
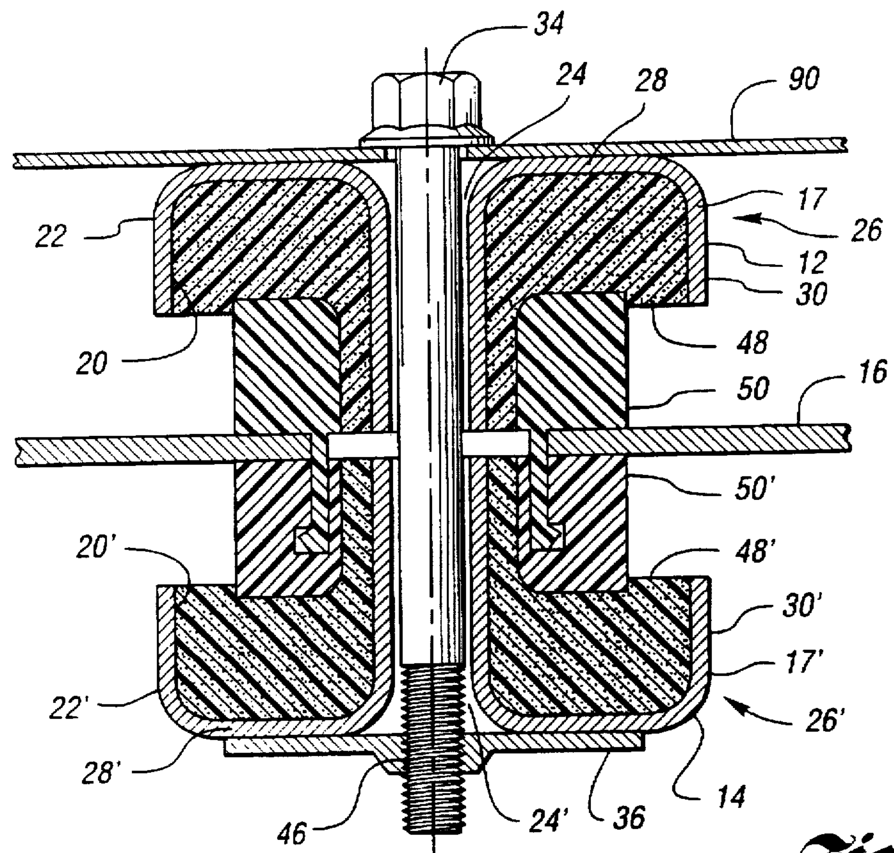
FIG. 3 is a cross-sectional view of an assembled vehicle body mount of the present invention.

As shown in FIGS. 1,2, and 3, the first spacer member 12 and second spacer member 14 each include a shell 17, 17'. The shells 17 and 17' may be made from any suitable material by any suitable method. For example, the shells 17 and 17' may be formed of sheet metal or the like by a stamping operation.

Each shell 17 and 17' has an inner wall 20 and 20' respectively, and an outer wall 22 and 22' respectively. Each shell 17 and 17' also defines a tubular portion 18 and 18'. The tubular portion 18 and 18' defines a hollow cylindrical bore 24 and 24' respectively. A flange, generally indicated at 26, 26', which includes a radially extending portion 28, 28' and an axially extending portion 30, 30', is integrally formed in the embodiment shown with tubular portion 18, 18'.

The cylindrical bores 24 and 24' extend through the center of the spacer members 12 and 14 and are adapted to receive a fastening device 34 which may have a threaded end, such as a bolt or the like.

Second spacer member 14 is further provided with a connector, which in this embodiment is a nut-type member generally indicated at 36. The connector 36 includes a planar first surface 38 which is connected to radially extending portion 28' of flange 26'. While the connector 36 may be attached in any suitable manner, in the preferred embodiment shown the connector 36 is spot welded at 40 to the flange 26'. The connector 36 further includes an aperture 42 which extends through the center of connector 36 and is aligned along the centerline "A" of cylindrical bore 24'. In a preferred embodiment, the aperture 42 includes threads 46 so as to engage the threaded end of fastening device 34 when the body mount assembly 10 is assembled.

Referring now to FIG. 2, the first and second spacer members 12 and 14 are each provided with absorption material 48 and 48' respectively. The absorption material 48 and 48' has an overall doughnut-shaped configuration and is integrally formed onto, or attached to, the surface of inner wall 20 and 20' of the shells 17 and 17' respectively. The absorption material 48, 48', which in a preferred embodiment is composed of a rubber, polyurethane foam, microcellular polyurethane or other suitable material such as ELASTOCELL® which may be procured from BASF Corporation, Plastics Materials, 1609 Biddle Ave., Wyandotte, Mich. 48192. In any event, the material is preferably a resilient material which acts as a vibration absorbing material to cushion impacts resulting during operation of a vehicle.

In addition, in this embodiment, the spacer members 12 and 14 are each provided with locking members 50 and 50' respectively. The locking members 50 and 50' may be integrally formed onto, or bonded, to the outer surface of absorption material 48, 48'. If the locking members are bonded to the absorption material, any suitable bonding agent may be used. The locking members 50 and 50' may be made from any suitable material, preferably from a harder resilient material such as nylon.

The locking members 50 and 50' in this embodiment are male and female locking members respectively. The female locking member 50' is configured so as to form a cylindrical or donut-shaped recess 60 at the top of the second spacer member 14 adjacent the absorption material 48'. A locking recess 62 is formed into the bottom of the recess 60 and preferably, like the recess 60, has a cylindrical or donut-shaped configuration such that the locking recess 62 is continuous along the perimeter of the recess 60.

The male locking member 50 has prongs 66, preferably three or more. At the bottom of each prong 66, facing outwardly, is a locking protrusion 68. The locking protrusion preferably has an inclined bottom surface 70 and an inclined upper surface 72. As shown in FIG. 3, the prongs 66 are dimensioned so as to fit within the recess 60 while the locking protrusions 68 are dimensioned to fit within the locking recess 62 when the first and second spacer members 12 and 14 are assembled.

Referring to FIGS. 2 and 3, the vehicle body mount assembly 10 is assembled as follows. First, the prongs 66 of the first spacer member 12 are aligned with and pushed through an aperture 80 in the vehicle frame 16. The locking recess 60 of the second spacer member 14 is then aligned with the locking prongs 66 before the first and second spacer members, 12 and 14, are pushed together. When the inclined bottom surfaces 70 of the prongs 66 of the first spacer member 12 engage the recess 60 of the second spacer member 14, the prongs 66 will be resiliently bent towards the axis "A" so as to allow the locking protrusion 68 to slide through the recess 60. As the first and second spacer members 12 and 14 are slid into a closer interlocking relationship, the locking protrusions 68 will engage the locking recess 62 of the recess 60 thereby allowing the prongs 66 of the first spacer member 12 to resiliently move back into their original unbent configuration. As a result, the first and second spacer members, 12 and 14, will be locked together as shown in FIG. 3.

In the event it is desired to remove the first and second spacer member 12 and 14 before final assembly of the vehicle frame 16 with a body panel 90, the first and second spacer members, 12 and 14, may be pried apart. If pried apart, the upper inclined surface 72 of the locking protrusion 68 will engage the recess 60 of the second spacer member 14 thereby resiliently bending the prongs 66 again towards the axis "A" such that the first and second spacer members 12 and 14 may be disassembled.

As shown in FIG. 3, once the first and second spacer members 12 and 14 are assembled, a body panel 90 having an aperture 92 may be assembled onto the vehicle frame 16 by aligning the aperture 92 of the body panel 90 with the cylindrical bores 24 and 24'. The fastening device 34 may then be passed through the aperture 92 of the body panel 90 and the aligned cylindrical bores 24 and 24' in such a manner as to fasten the body panel 90 to the first and second spacer members 12 and 14. In the embodiment shown, the fastening device 34 is a threaded bolt which threadably engages the connector 36 of the second spacer member 14.

During use, and in the case of vibrations tending to move the body panel 90 away from or towards the vehicle frame 16, the absorption material 48' and 48 will be compressed accordingly.

Note that in this embodiment of the invention, the inner walls 20 and 20', together with the locking members 50 and 50', tend to provide lateral support to the absorption material 48 and 48'. This allows certain types of absorption material 48 and 48' to be used which requires or works best with some lateral support, such as the BASF polyurethane foam already described.

Figure 4:
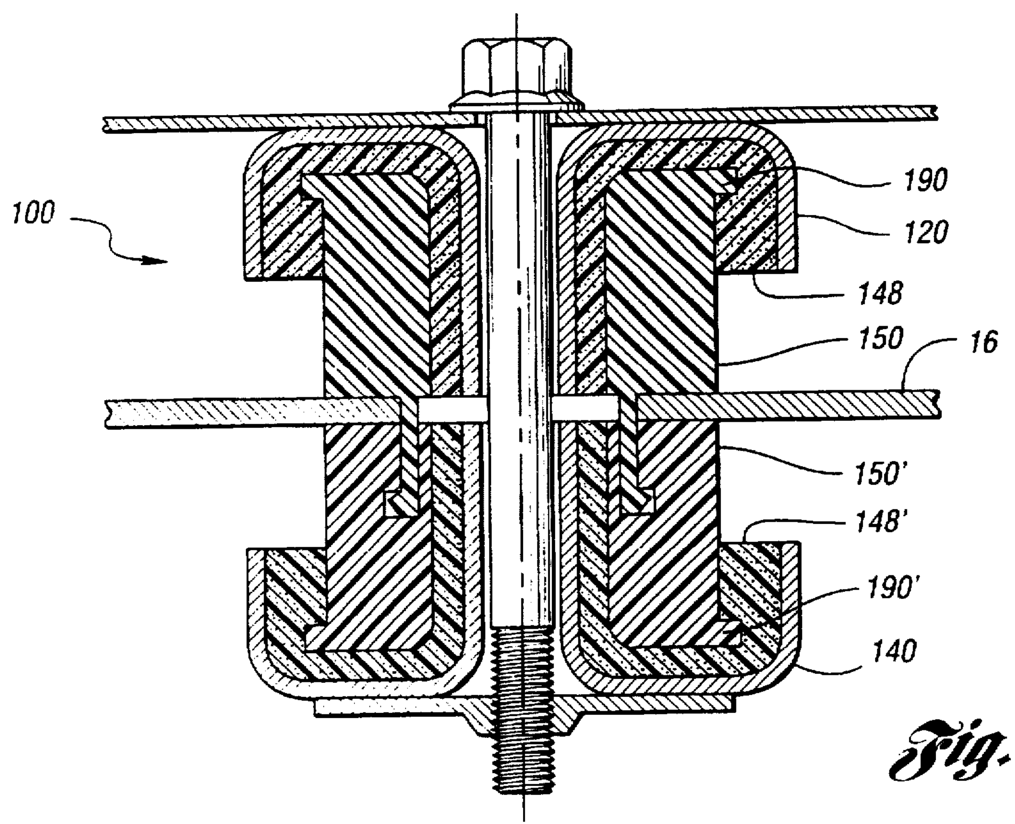
FIG. 4 is a cross-sectional view of a second embodiment of the present invention.

Referring to FIG. 4, a second embodiment of a vehicle body mount assembly 100 having upper and lower spacers is disclosed. This embodiment is similar to the embodiment shown in FIGS. 1–3 with the exception that the locking members 150 and 150' are longer and protrude deeper into the absorption material 148 and 148' and because the locking members 150 and 150' include projections 190 and 190' which protrude into the absorption material 148 and 148' so as to better maintain the connected relationship between the locking members 150 and 150' and the absorption material 148 and 148'.

While particular embodiments of the invention have been illustrated and described, it will be obvious to those skilled in the art that an infinite variety of changes and modifications may be made without departing from this invention. For example, and without limitation, the resilient rotation limitation members can have any configuration or dimensions found suitable. Also, the sleeve recess need not be an annular depression, but could have any suitable configuration. Furthermore, the rotation limitation members could be made from any suitable material. It is intended that the following claims cover all such modifications, any other modifications, and all equivalents that fall within the spirit of this invention.

What is claimed is:

1. A shock absorbing assembly capable of being connected to a vehicle frame member having a frame member aperture defining an aperture perimeter and for dampening movements between a body member and the vehicle frame member, the shock absorbing assembly comprising:

a first spacer member having first absorption material and a first locking member having one of a male and female configuration;

a second spacer member having second absorption material and a second locking member having the other of a male and female configuration; and the male configuration including at least one prong, the at least one prong having at least one locking protrusion, and the female configuration including at least one female recess, the female recess having at least one locking recess, such that the first spacer member may be connected to the second spacer member through the frame member aperture by inserting the at least one prong into the at least one female recess such that the at least one prong is displaced laterally before the at least one locking protrusion interlocks with the at least one locking recess.

2. The shock absorbing assembly of claim 1 wherein the at least one locking protrusion includes an inclined bottom surface.

3. The shock absorbing assembly of claim 2 wherein the at least one locking protrusion includes an inclined upper surface.

4. The shock absorbing assembly of claim 1 wherein the first spacer member has a first shell and the absorption material is laterally supported by the first shell and the first locking member and the second spacer member has a second shell and the absorption material is laterally supported by the second shell and the second locking member.

5. The shock absorbing assembly of claim 1 wherein at least one of the first and second locking members contact the aperture perimeter during movements between the body member and the vehicle frame member and transfer such movements to the first and second absorption material respectively.

6. The shock absorbing assembly of claim 1 wherein the locking members are made of plastic.

7. The shock absorbing assembly of claim 1 wherein the locking members are made of nylon.

8. A body mount assembly for connecting a body member having a body aperture to a vehicle frame member having a frame aperture defining an aperture perimeter, the body mount comprising:

a first spacer member having first absorption material and a first locking member and defining a first bore, the first locking member having one of a male and female configuration;

a second spacer member having second absorption material and a second locking member and defining a second bore, the second locking member having the other one of a male and female configuration; and the male configuration including at least one prong, the at least one prong having at least one locking protrusion, and the female configuration including at least one female recess, the at least one female recess having at least one locking recess, such that the first spacer member may be connected to the second spacer member through the frame member aperture by inserting the at least one prong into the at least one female recess such that the at least one prong is displaced laterally before the at least one locking protrusion interlocks with the at least one locking recess such that the first and second bores are aligned.

9. The body mount assembly of claim 8 wherein the first spacer member has a first shell and the absorption material is laterally supported by the first shell and the first locking member.

10. The body mount assembly of claim 9 wherein the second spacer member has a second shell and the absorption material is laterally supported by the second shell and the second locking member.

11. The body mount assembly of claim 8 further including a fastening device which, after the body member aperture is aligned with the first and second bores, is used to attach the body member to the first and second spacer members via the body member aperture and the first and second bores.

12. The body mount assembly of claim 11 wherein one of the first and second spacer members includes a connector having a threaded aperture and the fastening device is a threaded bolt member which is situated through the body aperture and first and second bore and threadably engages the threaded aperture so as to attach the body member to the first and second spacer members.

13. The shock absorbing assembly of claim 8 wherein the at least one locking protrusion includes an inclined bottom surface.

14. The shock absorbing assembly of claim 13 wherein the at least one locking protrusion includes an inclined upper surface.

15. The body mount assembly of claim 8 wherein both of the first and second locking members are adjacent the aperture perimeter so as to transmit any contact forces with the aperture perimeter to at least one of the first and second absorption material.

16. The body mount assembly of claim 8 wherein the locking members are made of plastic.

17. The body mount assembly of claim 8 wherein the locking members are made of nylon.

18. A vehicle body mount assembly for connecting a body member having a body aperture to a vehicle frame member having a frame aperture defining an aperture perimeter, the body mount assembly comprising:

a first spacer member having a first shell, first absorption material, and a first locking member, the first shell having a first tubular portion, a first flange and a first inner wall, the first absorption material located adjacent and connected to the first inner wall, the first locking member having one of a male and female configuration and being connected adjacent to the first absorption material, and the first flange having a first radially extending portion and a first axially extending portion such that the first absorption material is laterally supported between the first tubular portion, the first axially extending portion, and the first locking member;

a second spacer member having a second shell, second absorption material, and a second locking member, the second shell having a second tubular portion, a second flange, and a second inner wall, the second absorption material located adjacent and connected to the second inner wall, the second locking member having the other one of a male and female configuration and being connected adjacent the second absorption material, and the second flange having a second radially extending portion and a second axially extending portion such that the second absorption material is laterally supported between the second tubular portion, the second axially extending portion, and the second locking member, such that the first spacer member may be connected to the second spacer member through the frame member aperture by interlocking the first and second locking members such that the first and second tubular portions are aligned.

19. The body mount assembly of claim 18 wherein the male configuration includes at least one prong having at least one locking protrusion and the female configuration includes at least one female recess, the female recess having at least one locking recess such that the first spacer member may be connected to the second spacer member through the frame member aperture via the insertion of the at least one prong into the female recess and the interlocking of the at least one prong having at least one locking protrusion with the at least one locking recess such that the first and second tubular portions are aligned.

20. The body mount assembly of claim 19 wherein the first and second spacer members have first and second axes respectively and the at least one female recess is a cylindrical space and the at least one locking recess is continuous along a perimeter of the at least one female recess such that the one of the first and second locking member having the male configuration may be rotated about one of the first and second axes before the at least one prong having at least one locking protrusion is inserted into the at least one female recess.

21. The body mount assembly of claim 18 wherein the first and second absorption material surrounds the first and second tubular portions respectively.

22. The body mount assembly of claim 21 wherein the first and second locking members surround that portion of the first and second absorption material respectively which is not laterally supported by the first and second radially extending portion of the first and second flanges respectively.

23. The body mount assembly of claim 18 further including a fastening device which is located through the body aperture of the first and second tubular portions so as to attach the body member to the first and second spacer members.

24. The vehicle body mount assembly of claim 18 wherein the locking members are made of plastic.

25. The vehicle body mount assembly of claim 18 wherein the locking members are made of nylon.

26. A shock absorbing assembly capable of being connected to a vehicle frame member having a frame member aperture defining an aperture perimeter and for dampening movement between a body member and the vehicle frame member, the shock absorbing assembly comprising:

a first spacer member having first absorption material and a first locking member having one of a male and female configurations;

a second spacer member having second absorption material and a second locking member having the other of a male and female configuration; and the male configuration including at least one prong having at least one locking protrusion, the locking protrusion having an inclined bottom surface, and the female configuration including at least one female recess, the female recess having at least one locking recess, such that the first member may be connected to the second member through the frame member aperture by inserting the at least one prong into the at least one female recess such that the at least one prong is displaced laterally by the inclined bottom surface engaging the female recess before the at least one prong interlocks with the at least one locking recess.

27. The shock absorbing assembly of claim 26 wherein the at least one locking protrusion includes an inclined upper surface.

28. The shock absorbing assembly of claim 26 wherein the first spacer member has a first shell and the absorption material is laterally supported by the first shell and the first locking member, and the second spacer member has a second shell and the absorption material is laterally supported by the second shell and the second locking member.

29. The shock absorbing assembly of claim 26 wherein at least one of the first and second locking members contact the aperture perimeter during movements between the body member and the vehicle frame member and transfer such movements to the first and second absorption material respectively.

30. The shock absorbing assembly of claim 26 wherein the locking members are made of plastic.

31. The shock absorbing assembly of claim 26 wherein the locking members are made of nylon.

32. A body mount assembly for connecting a body member having a body aperture to a vehicle frame member having a frame aperture defining an aperture perimeter, the body mount comprising:

a first spacer member having first absorption material and a first locking member and defining a first bore, the first locking member having one of a male and female configuration;

a second spacer member having second absorption material and a second locking member and defining a second bore, the second locking member having the other one of a male and female configuration; and the male configuration including at least one prong having at least one locking protrusion, the at least one locking protrusion having an inclined bottom surface, and the female configuration including at least one female recess, the at least one female recess having at least one locking recess, such that the first spacer member may be connected to the second spacer member through the frame member aperture by inserting the at least one prong into the at least one female recess such that the at least one prong is displaced laterally by the inclined bottom surface engaging the female recess before the at least one locking protrusion interlocks with the at least one locking recess such that the first and second bores are aligned.

33. The body mount assembly of claim 32 wherein the at least one locking protrusion includes an inclined upper surface.

* * * * *